(12) United States Patent
Tani

(10) Patent No.: US 6,773,528 B2
(45) Date of Patent: Aug. 10, 2004

(54) PROCESS FOR PRODUCING FIBER-REINFORCED-SILICON CARBIDE COMPOSITES

(75) Inventor: Eiji Tani, Tosu (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 10/322,449

(22) Filed: Dec. 19, 2002

(65) Prior Publication Data

US 2003/0145934 A1 Aug. 7, 2003

Related U.S. Application Data

(63) Continuation of application No. 09/505,686, filed on Feb. 17, 2000.

(30) Foreign Application Priority Data

Mar. 1, 1999 (JP) .............................. 11-52163
Jul. 15, 1999 (JP) ........................... 11-201388

(51) Int. Cl.$^7$ .......................... C04B 35/565; B05D 3/02
(52) U.S. Cl. .................. 156/89.26; 264/682; 264/29.1; 264/29.5; 264/29.6; 264/29.7
(58) Field of Search .......................... 156/89.25, 89.26; 264/29.1, 29.2, 29.3, 29.4, 29.5, 29.6, 29.7

(56) References Cited

U.S. PATENT DOCUMENTS

| | | | |
|---|---|---|---|
| 4,597,923 A | 7/1986 | Kennedy et al. | |
| 4,737,328 A | 4/1988 | Morelock | |
| 4,795,673 A | 1/1989 | Frechette et al. | |
| 4,892,790 A | 1/1990 | Gray | |
| 5,015,540 A | 5/1991 | Borom et al. | |
| 5,094,901 A | 3/1992 | Gray | |
| 5,294,460 A | 3/1994 | Tani et al. | |
| 5,294,489 A | 3/1994 | Luthra et al. | |
| 5,552,352 A | 9/1996 | Brun et al. | |
| 5,585,313 A | 12/1996 | Shobu et al. | |
| 5,589,115 A | 12/1996 | Sherwood | |
| 5,698,143 A | 12/1997 | Tani et al. | |
| 5,962,103 A | 10/1999 | Luthra et al. | |
| 6,231,791 B1 | 5/2001 | Heine et al. | |
| 6,258,737 B1 | 7/2001 | Steibel et al. | |
| 6,261,981 B1 * | 7/2001 | Dietrich et al. | |
| 2003/0035901 A1 * | 2/2003 | Tani | |

FOREIGN PATENT DOCUMENTS

| | | |
|---|---|---|
| JP | 5-186266 | 7/1993 |
| JP | 2735151 | 1/1998 |
| JP | 2879675 | 1/1999 |
| WO | 98/42635 | * 10/1998 |

OTHER PUBLICATIONS

Webster's Ninth New Collegiate Dictionary, Merriam–Webster Inc, 1984, p. 929.*

* cited by examiner

Primary Examiner—Melvin C. Mayes
(74) Attorney, Agent, or Firm—Oblon, Spivak, McClelland, Maier & Neustadt, P.C.

(57) ABSTRACT

A process produces a fiber-reinforced silicon carbide composite. The resulting composite has a high toughness where bundles of a reinforcing fiber are densely covered with glassy carbon derived from a resin to avoid deterioration of the strength, and it can easily be produced even in complicated shapes. Specifically, a fiber-reinforced silicon carbide composite is produced by preparing a fiber prepreg containing a powdered silicon and a resin and molding the prepreg to yield a green body having a desired shape, or laminating a fiber prepreg containing a resin and a woven fabric prepreg containing a powdered silicon and a resin in alternate order, and molding the laminate to yield a green body having a desired shape; carbonizing the green body at 900° C. to 1350° C. in an inert atmosphere; impregnating the carbonized body with a resin; firing the impregnated body again at 900° C. to 1350° C. in an inert atmosphere; performing the resin impregnation-carbonization procedure one to five times; subjecting the carbonized composite to reaction sintering at a temperature of 1300° C. or more in vacuo or in an inert atmosphere to form open pores, and finally infiltrating molten silicon into the sintered body having open pores at a temperature of about 1300° C. to 1800° C. in vacuo or in an inert atmosphere.

10 Claims, No Drawings

PROCESS FOR PRODUCING FIBER-REINFORCED-SILICON CARBIDE COMPOSITES

This application is a continuation of Ser. No. 09/505,686 filed Feb. 17, 2000.

FIELD OF THE INVENTION

The present invention relates to a process for producing fiber-reinforced silicon carbide composites. Specifically, the present invention relates to a process for producing fiber-reinforced silicon carbide composites which are suitable for a variety of applications requiring improved toughness, such as aerospace high-temperature structural members, gas turbine members, fusion reactor materials, furnace members, heater materials, and artificial bones.

DESCRIPTION OF THE RELATED ART

Silicon carbide ceramics are light-weight and are excellent in, for example, heat resistance, abrasion resistance, and corrosion resistance; they have recently come into wide use as, for instance, high-temperature corrosion-resistant members, heater members, abrasion resistant members, as well as abrasives and grindstones. Such silicon carbide ceramics are, however, low in fracture toughness, and have not yet been used in practice as structural members for use at high temperatures.

Ceramic composites compounded with fibrous reinforcements to improve the toughness of such ceramics have been intensively investigated in recent years. Such fiber-reinforced silicon carbide composites are generally manufactured by, for example, (1) an organometallic polymer impregnation pyrolysis (PIP) process, (2) a chemical vapor infiltration (CVI) process, and (3) infiltration of molten silicon (reaction sintering process).

However, the organometallic polymer impregnation pyrolysis (PIP) process has the following disadvantages in practice. According to this process, only low density and low strength can be obtained by a single impregnation, and the impregnation and pyrolysis procedure must be repeated about ten times to reduce the open porosity to 10% or less to and thereby improve strength characteristics. The process therefore requires a long time for production. The chemical vapor infiltration process (2) can provide products having complicated shapes at comparatively low temperatures of about 1100° C., but it requires a very long time, of as much as several months, for infiltration, and gases used therefore are toxic. In addition, composites having an open porosity not exceeding 5% cannot be significantly obtained by the single use of the process (1) or (2).

In contrast, the reaction sintering process (3) requires only a short reaction time and can yield dense composites in a short time period. According to a process employed in Deutsche Forschungs-und Versuchsanstalt fur Luft-und Raumfahrt (DLR), a carbon fiber-reinforced carbon-silicon carbide composite is produced by infiltrating molten silicon into cracks of a carbon-fiber-reinforced carbon composite (C/C composite) to convert part of the matrix carbon into silicon carbide. This process utilizes a phenomenon in which glassy carbon does not react significantly with molten silicon to avoid the reaction between the carbon fiber and the silicon. In the process, however, the mechanical properties depend to a large degree on shapes of the cracks, which shapes in turn depend, for example, on the type of the carbon fiber and on the heat treatment temperature. High mechanical properties can therefore only be provided under specific production conditions suitable for the fiber to be used. The reaction sintering process (3) also includes a process of infiltrating molten silicon into a composite of a carbon powder and a fiber, which is performed by General Electric Co., USA, and Toshiba Corporation, Japan. This process is also disadvantageous in that a large quantity of silicon must be infiltrated, which invites free silicon to remain in large amounts of about 15%, or causes a reaction between the fiber and silicon unless the fiber is coated with boron nitride (BN) or the like.

After investigations on similar ceramic composites, the present inventors previously found that a unidirectional carbon-fiber-reinforced silicon carbide composites having a flexural strength of about 200 to 300 MPa even though having a large open porosity of 30% can be produced by compounding a matrix of a mixture of silicon powder and phenol resin with carbon fiber, and firing the composite in an inert atmosphere. The resultant composite contains a matrix of silicon carbide formed by reaction sintering (Japanese Patent No. 2045825). According to the reaction, however, only porous composites having a large open porosity can be obtained, as the volume of the matrix decreases about 38%. They also found that a unidirectionally carbon-fiber-reinforced silicon carbide composite having a flexural strength of about 500 to 600 MPa, even though it has a large open porosity of about 20%, can be produced by reducing the particle of the silicon powder about 5 $\mu$m or below and by adding an organometallic polymer (Japanese Patent No. 2735151), and that a two-dimensional fiber-reinforced composite having a relatively large open porosity of about 15% as a two-dimensional fiber-reinforced silicon-carbide carbon composite, but having a flexural strength of about 300 MPa, can be obtained by heat-treating a green body containing a fibrous woven fabric reinforcement at a temperature at which silicon does not react with carbon, repeating impregnation and carbonization of a phenol resin, and finally forming silicon carbide (Japanese Patent No. 2879675).

SUMMARY OF THE INVENTION

It is an object of the present invention to solve the various problems in the production of fiber-reinforced silicon carbide composites according to the conventional silicon melt infiltration technique, and to provide a process for producing fiber-reinforced silicon carbide composites, which process can easily yield a composite having a high toughness even if they are to have complicated shapes.

Specifically the invention is directed to provide a process for easily producing fiber-reinforced silicon carbide composites even if they are to have complicated shapes, by covering a fiber bundle region with glassy carbon derived from resin, forming a porous region in a specific portion of a matrix by a reaction between silicon powder and carbon derived from the resin to form silicon carbide, which reaction is accompanied by volumetric reduction, and subjecting the porous region to infiltration of molten silicon. The resultant fiber-reinforced silicon carbide composite is high in toughness and its strength is not deteriorated, without coating the fiber surface with, for example, BN.

After intensive investigations on the production of fiber-reinforced silicon carbide composites to achieve the above objects, the inventors found that a dense fiber-reinforced silicon carbide composite showing nonlinear fracture can be obtained by preparing and molding a prepreg including silicon powder, carbon source resin and fiber to yield a green body, or laminating a prepreg containing resin with a prepreg containing silicon powder and resin in alternate order and molding the laminate to yield a green body; carbonizing the molded green body at a temperature of about 900° C. to 1350° C. in an inert atmosphere; preferably, impregnating the carbonized composite with a resin and carbonizing the impregnated composite at a temperature of about 900° C. to 1350° C. in an inert atmosphere, and repeating this impregnation-carbonization procedure; subjecting the composite to reaction sintering at a temperature of about 1300° C. or higher in vacuo or in an inert atmosphere, and finally infiltrating molten silicon into the sintered composite at a temperature of about 1300° C. to 1800° C. in vacuo or in an inert atmosphere. The present invention has been accomplished on the basis of the above findings.

Specifically, in the process for producing a fiber-reinforced silicon carbide composite of the invention, (i) a mixture of silicon powder, a carbon source resin and reinforcement fiber is carbonized in an inert atmosphere, and the resultant carbonized composite is impregnated with resin and is subjected to carbonization or the like, or (ii) a mixture of (a) a matrix containing silicon powder and carbon source resin, and porous fiber as a container, and (b) reinforcing fiber containing carbon source resin is carbonized in an inert atmosphere, and the carbonized composite is impregnated with a resin and subjected to carbonization or the like. By the procedure of (i) or (ii), carbon in a fiber bundle region as a reinforcement is densified to prevent the fiber from reacting with molten silicon, then open pores are formed in a matrix region by reaction sintering, and molten silicon is infiltrated into only the open pores in the matrix in vacuo or in an inert atmosphere.

According to the inventive process, dense fiber-reinforced silicon carbide composites can be easily obtained without deteriorating the strength of the fiber, even if they are of complicated shape.

Preferred carbon source resins to be used in the invented process include, but are not limited to, phenol resins, furan resins, pitch, and polycarbosilane and other organometallic polymers. Each of these resins may be used alone or in combination. The resin may further include, for instance, a carbon powder, a graphite powder, carbon black, or an aggregate; and/or an antioxidant such as silicon carbide, silicon nitride, mullite, molybdenum disilicide, molybdenum, boron carbide, or boron powder.

The silicon may be either pure metallic silicon or a silicon alloy with, for example, magnesium, aluminum, titanium, chromium, manganese, iron, cobalt, nickel, copper, zinc, zirconium, niobium, or molybdenum.

In addition, a fibrous woven fabric reinforcement is employed in the invented process, and preferred fibrous woven fabrics to constitute the fibrous reinforcement include, but are not limited to, woven fabrics of carbon fibers, silicon carbide fibers, silicon nitride fibers, and oxide fibers. The carbon fibers may be either of pitch fibers or acrylonitrile fibers. Each of these fibrous woven fabrics can be used independently or in combination. Nonwoven fabrics or laminates of transversely laid sheet-like unidirectional fiber prepregs may also be used instead of fibrous woven fabrics.

As the fiber in the matrix to contain the silicon powder and resin, porous woven or nonwoven fabrics are preferred composed of, for example, carbon fibers, silicon carbide fibers, silicon nitride fibers or oxide fibers, as well as porous sheets composed of carbon, silicon carbide, a resin or a plastic. The use of the container can be omitted by coating a resin-impregnated woven fabric prepreg with a mixture of silicon powder and carbon source resin.

According to the inventive process as described above, dense fiber-reinforced silicon carbide composites can easily be produced by covering a fiber bundle region of a two-dimensional fiber reinforced silicon carbide composite with amorphous carbon derived from an impregnated resin to densify the region; forming open pores in spaces between the fibers or between the fibrous woven fabrics with the use of reaction sintering of, for example, a phenol resin with silicon powder; and infiltrating molten silicon into the open pores.

In addition, and advantageously, the invented process can easily yield green bodies (molded parts) having complicated shapes because hot pressing or other techniques are not required. Furthermore, the process can yield dense composites without deteriorating the fiber, as molten silicon is infiltrated in the last step.

Next, preferred embodiments of the present invention will be described.

According to the first embodiment of the invented process (hereinafter simply referred to as "the first process"), a continuous woven fabric as a fibrous reinforcement is impregnated with dissolved resin, is dried, and is further impregnated with a slurry of a mixture of resin and a silicon powder; is dried to give a prepreg; and the prepreg is molded into a desired shape. The molding is carried out by, for example, dissolving resin in suitable solvent, impregnating a continuous fiber woven fabric with the resin solution, removing the solvent by drying, separately preparing a slurry composed of resin, silicon powder and solvent, impregnating continuous fiber woven fabric with the slurry, removing the solvent by drying, molding the dried product in an appropriate die at a temperature of, generally, about 100° C. to 250° C. into a desired shape. In this procedure, the dissolved liquid resin is incorporated into spaces between fiber bundles, but the powdered silicon, which generally has a relatively large particle size of about 10 $\mu$m, is unevenly distributed and present only in spaces between the fibrous woven fabric.

In addition, and advantageously, the following process according to the second embodiment (hereinafter simply referred to as "the second process") is also effective. According to the second process, continuous fiber woven fabric as a fibrous reinforcement is impregnated with dissolved resin, and is dried to give fiber prepregs; separately, a slurry is prepared by mixing resin and silicon powder, nonwoven fabric is impregnated with the slurry, and is dried to give matrix prepregs; and the fiber prepregs and the matrix prepregs are laminated in alternate order, and the laminate is molded into a desired shape. The laminate may have each layer comprising a plurality of individual prepregs. The molding can be performed by, for example, dissolving a resin in a suitable solvent, impregnating continuous fiber woven fabric with the resin solution, removing the solvent by drying to give fiber prepregs, separately preparing a slurry from resin, silicon powder and a solvent, impregnating nonwoven fabric with the slurry, removing the solvent by drying to give matrix prepregs, laminating an each an adequate number of these prepregs in alternate order, and molding the laminate in an appropriate die at a temperature of, generally, about 100° C. to 250° C. into a desired shape.

The silicon powder to be used in the invented process is preferably fine powder, and particularly fine powder having a mean particle size not exceeding 20 $\mu$m. Silicon powders having a relatively large diameter should preferably be pulverized with, for example, a ball mill, before use.

The obtained green body (molded body) is then carbonized at a temperature of about 900° C. to 1350° C. in an argon or other inert atmosphere to avoid the reaction of carbon derived from the resin with silicon. The carbonized composite has regions composed of the resin alone, and regions composed of a mixture of the silicon powder and carbon derived from the resin, but it has a high porosity, because the resin is pyrolyzed into carbon.

The fired body is impregnated with a resin solution in vacuo or under pressure, and is carbonized at a temperature of about 900° C. to 1350° C. in an argon or other inert atmosphere to avoid the reaction of carbon derived from the resin with silicon. A combination procedure of the resin impregnation and carbonization is repeated a predetermined number of times, preferably one to five times, and the resultant composite is fired at a temperature of 1300° C. or higher in vacuo or in an argon or other inert atmosphere to react carbon derived from the resins with silicon to form porous silicon carbide in spaces between the fiber woven fabric.

A composite is thus obtained comprising fiber bundles coated with dense carbon so as not to react with molten silicon, and a porous silicon carbide matrix between layers of the fiber woven fabric.

The composite is heated to a temperature of about 1300° C. to 1800° C. in vacuo or in an inert atmosphere to infiltrate molten silicon into open pores of the composite (fired body), which open pores include the porous silicon carbide matrix between the layers of the fiber woven fabric, to give a fiber reinforced silicon carbide composite. The reaction sintering of silicon with carbon and infiltration of molten silicon can be performed in the same heat treatment.

The proportion of the silicon powder to the resin to be used in the inventive process should preferably be selected from such a range that the atomic ratio of silicon to carbon derived from the resin, Si/C, ranges from 0.1 to 4. The prepregs may be prepared by, as described above, coating the fabric with phenol resin or another resin alone, and coating the coated fabric with a slurry containing silicon powder and phenol resin or another resin. In other words, the proportion of silicon to carbon in the composite can be distributed unevenly. The proportion of silicon carbide matrix to the fiber woven fabric reinforcement in the fiber-reinforced composite can be freely selected according to the application of the composite, but generally, the fiber occupies about 15% to 65% by volume in the composite.

In the invention, the prepreg containing the reinforcing fiber woven fabric can be prepared by any of the following techniques: (i) a technique of using resin from the beginning to yield a prepreg, as described above; (ii) a technique which comprises laminating a container for silicon powder and resin, or silicon powder and aggregate powder with a fiber woven fabric containing no resin to yield a green body, and impregnating the green body with resin to yield a preform; and (iii) a technique which comprises laminating a container for neither silicon nor resin with reinforcing fiber woven fabric containing resin to yield a green body, and impregnating the green body with a slurry containing silicon powder and resin.

Another resin impregnation can be performed after the reaction sintering of carbon from phenol resin or other resin with silicon powder, which is completed at temperatures of 1300° C. or higher. Separately, the reaction sintering can be conducted prior to, or concurrently with, the infiltration of molten silicon.

EMBODIMENT

The invention will be further illustrated in detail with reference to several invented examples and comparative examples below which are not intended to limiting the scope of the invention.

EXAMPLE 1

Phenol resin was dissolved in ethanol to yield a slurry; silicon carbide fiber woven fabric was impregnated with the slurry and was dried. Separately, phenol resin and silicon powder were respectively weighed so as to set the atomic ratio of carbon to silicon at 10:8, which carbon was derived from the phenol resin to be carbonized. The phenol resin was dissolved in ethanol to yield a solution, and the silicon was mixed by ball-milling for one day to reduce its particle size and was then added to the resin solution to yield a slurry, and fiber woven fabric was impregnated with the resultant slurry.

The slurry-impregnated fiber woven fabric was dried, and was molded in a die at about 130° C. to yield a green body, and the green body was fired and carbonized at 1000° C. in an argon atmosphere for 1 hour. The carbonized body was impregnated in vacuo with a phenol resin solution in ethanol, and was fired and carbonized at 1000° C. in an argon atmosphere for 1 hour. The resultant composite was subjected to a treatment at 1450° C. in vacuo for 1 hour to conduct reaction sintering and infiltration of molten silicon concurrently and thereby yield a dense composite having a bulk density of 2.20 g/cm$^3$ and an open porosity of 3.2%. The composite had a flexural strength of 117 MPa, its fracture behavior was not brittle, and the load reached the maximum at a strain of 0.13%, and gradually decreased after the maximum point.

EXAMPLE 2

A green body was prepared in the same manner as in Example 1, and was fired and carbonized at 1000° C. in an argon atmosphere for 1 hour. The fired body was impregnated in vacuo with a phenol resin solution in ethanol, and was fired and carbonized at 1000° C. in an argon atmosphere for 1 hour. The obtained composite was again impregnated in vacuo with a phenol resin solution in ethanol, and was fired and carbonized at 1000° C. in an argon atmosphere for 1 hour, and then was subjected to a treatment at 1450° C. in vacuo for 1 hour to conduct reaction sintering and infiltration of molten silicon concurrently and thereby yield a dense composite having a bulk density of 2.29 g/cm$^3$ and an open porosity of 1.2%. The composite had a flexural strength of 156 MPa, its fracture behavior was nonlinear, and the load reached the maximum at a strain of 0.21%, and gradually decreased after the maximum point.

Comparative Example 1

A green body was prepared and molded in the same manner as in Example 1, except that phenol resin was not impregnated, and the obtained green body was fired at 1450° C. in an argon atmosphere for 1 hour to yield a composite having a bulk density of about 1.66 g/cm$^3$ and an open porosity of about 32.7%. Molten silicon was infiltrated into the composite at 1450° C. in vacuo for 1 hour to yield a dense composite having a bulk density of 2.46 g/cm$^3$ and an open porosity of 2.4%. The composite had a flexural strength of 103 MPa, but its fracture behavior was brittle, and the load reached the maximum at a strain of 0.06%, and suddenly decreased, and the composite failed.

EXAMPLE 3

Phenol resin was dissolved in ethanol to yield a slurry; and a silicon carbide fiber woven fabric was impregnated with the slurry and was dried. Separately, phenol resin and silicon powder were respectively weighed so as to set the atomic ratio of carbon relative to silicon at 2:3, which carbon was derived from the phenol resin to be carbonized. The phenol resin dissolved in ethanol and silicon powder were mixed by ball-milling for one day to reduce its particle diameter, and a carbon-fiber nonwoven fabric was impregnated with this mixed slurry and was dried.

Next, two plies of the slurry-impregnated non-woven fabric and two plies of the silicon carbide fiber woven fabric impregnated with phenolic resin were laminated in alternate order, and the laminate was molded in a die at about 130° C. with the mixed slurry-impregnated nonwoven fabric at both ends. The molded body was fired and carbonized at 1000° C. in an argon atmosphere for 1 hour. The fired body was impregnated in vacuo with a phenol resin solution in ethanol, and was fired and carbonized at 1000° C. in an argon atmosphere for 1 hour. The obtained composite was subjected to a treatment at 1450° C. in vacuo for 1 hour to perform reaction sintering and infiltration of molten silicon concurrently and to thereby yield a dense composite having a bulk density of 2.29 g/cm$^3$ and an open porosity of 0.8%. The composite had a flexural strength of 142 MPa, and in its fracture behavior, the load linearly increased to the maximum point at a strain of 0.11%, and then gradually decreased after the maximum point.

EXAMPLE 4

A green body was obtained in the same manner as in Example 3, and was fired and carbonized at 1000° C. in an argon atmosphere for 1 hour. The fired body was then impregnated in vacuo with a phenol resin solution in ethanol, and was fired and carbonized at 1000° C. in an argon atmosphere for 1 hour. The resultant composite was again impregnated in vacuo with a phenol resin solution in ethanol, and was fired and carbonized at 1000° C. in an argon atmosphere for 1 hour, and was subjected to a treatment at 1450° C. in vacuo for 1 hour to perform reaction sintering and infiltration of molten silicon concurrently to and thereby yield a dense composite having a bulk density of 2.21 g/cm$^3$ and an open porosity of 3.1%. The composite had a flexural strength of 133 MPa, and in its fracture behavior, the load linearly increased to the maximum point at a strain of 0.08%, and slightly decreased after the maximum point, and then again gradually increased to a point at a stain of 0.16%.

EXAMPLE 5

Phenol resin was dissolved in ethanol to yield a slurry; a silicon carbide fiber woven fabric with the slurry and was dried. Separately, phenol resin and silicon powder were respectively weighed so as to set the atomic ratio of carbon to silicon at 10:8, which carbon was derived from the phenol resin to be carbonized. Phenol resin dissolved in ethanol and silicon powder were mixed by ball-milling for one day to reduce its particle diameter, and a carbon fiber nonwoven fabric was impregnated with the mixed slurry and was dried.

Each layer of the mixed slurry-impregnated nonwoven fabric and each two layers of the silicon carbide fiber woven fabric impregnated with phenolic resin were laminated in alternate order, and the laminate was molded in a die at about 130° C. with the mixed slurry-impregnated nonwoven fabric at both ends. The molded body was fired and carbonized at 1000° C. in an argon atmosphere for 1 hour; the fired body was impregnated in vacuo with a phenol resin solution in ethanol, and was fired and carbonized at 1000° C. in an argon atmosphere for 1 hour. The obtained composite was again impregnated in vacuo with a phenol resin solution in ethanol, and was fired and carbonized at 1000° C. in an argon atmosphere for 1 hour; and finally, was subjected to a treatment at 1450° C. in vacuo for 1 hour to perform reaction sintering and infiltration of molten silicon concurrently and to thereby yield a dense composite having a bulk density of 2.16 g/cm$^3$ and an open porosity of 3.2%. The composite had a flexural strength of 168 MPa, and in its fracture behavior, the load linearly increased to a point at a strain of 0.08%, and nonlinearly increased thereafter, attained the maximum at a strain of 0.27%, and then gradually decreased.

Comparative Example 2

Phenol resin and silicon powder were respectively weighed so as to set the atomic ratio of carbon to silicon at 5:3, which carbon was derived from the phenol resin to be carbonized. The phenol resin dissolved in ethanol and silicon powder were mixed by ball-milling for one day to reduce its particle size, and a fiber woven fabric was impregnated with the mixed slurry.

After drying, the slurry-impregnated fiber woven fabric was molded in a die at about 130° C., and the molded body was fired and carbonized at 1000° C. in an argon atmosphere for 1 hour-to yield a fired body. The fired body was impregnated in vacuo with a phenol resin solution in ethanol and then was fired and carbonized at 1000° C. in an argon atmosphere for 1 hour. The carbonized composite was fired at 1450° C. in an argon atmosphere for 1 hour to perform reaction sintering and was then subjected to infiltration of molten silicon at 1500° C. in vacuo for 1 hour to yield a dense composite having a bulk density of 2.69 g/cm$^3$ and an open porosity of 1.1%. The composite had a flexural strength of 121 MPa, its fracture behavior was brittle, and the load reached the maximum at a strain of 0.06%, and suddenly decreased and the composite failed.

What is claimed is:

1. A process for producing a fiber-reinforced silicon carbide composite, said process comprising:
    impregnating a fiber prepreg with resin;
    coating the resin-impregnated fiber prepreg by further impregnating the resin-impregnated fiber prepreg with silicon powder and resin;
    molding the fiber prepreg containing silicon powder and resin into a desired shape to yield a green body;
    carbonizing said green body at a temperature in the range of about 900° C. to about 1350° C. in an inert atmosphere to yield a carbonized composite;
    subjecting said carbonized composite to reaction sintering at a temperature of about 1300° C. or higher in vacuo or in an inert atmosphere to form open pores; and
    infiltrating molten silicon into the open pores of the sintered composite at a temperature in the range of about 1300° C. to about 1800° C. in vacuo or in an inert atmosphere.

2. The process according to claim 1, wherein a resin impregnation-carbonization procedure is performed one to five times after the carbonization of the green body to yield the carbonized composite.

3. The process according to claim 1, wherein in said impregnating a fiber prepreg the resin is at least one selected from the group consisting of a phenol resin, a furan resin, pitch, and an organometallic polymer.

4. The process according to claim 1, wherein in said impregnating a fiber prepreg the resin is at least one selected from the group consisting of a phenol resin, a furan resin, pitch, and an organometallic polymer, and wherein said resin further comprises a carbon powder, a graphite powder, carbon black, or an aggregate.

5. The process according to claim 1, wherein in said impregnating a fiber prepreg the resin is at least one selected from the group consisting of a phenol resin, a furan resin, pitch, and an organometallic polymer, and wherein said resin further comprises at least one antioxidant selected from the group consisting of silicon carbide, silicon nitride, mullite, molybdenum disilicide, molybdenum, boron carbide, and powdered boron.

6. The process according to claim 1, wherein said silicon powder is metallic silicon or a silicon alloy with magnesium, aluminum, titanium, chromium, manganese, iron, cobalt, nickel, copper, zinc, zirconium, niobium, or molybdenum.

7. The process according to claim 1, wherein said silicon powder is a fine powder having a mean particle diameter not exceeding 20 $\mu$m.

8. The process according to claim 1, wherein the proportion of silicon powder to the resin is determined so that the atomic ratio, Si/C, of silicon to carbon derived from the resin ranges from 0.1 to 4.

9. The process according to claim 1, wherein said fiber prepreg comprises a fibrous reinforcement and is at least one of a long fiber or a short fiber, wherein said fiber is selected from carbon fibers, silicon carbide fibers, silicon nitride fibers and oxide fibers.

10. The process according to claim 1, wherein a fiber to contain the silicon powder and resin is composed of porous woven or nonwoven fabrics, or porous resin or plastic sheets.

* * * * *